Oct. 29, 1929.  C. E. FULLER  1,733,221
PALLET SQUARING AND ALIGNING DEVICE
Filed Oct. 12, 1927  2 Sheets-Sheet 1
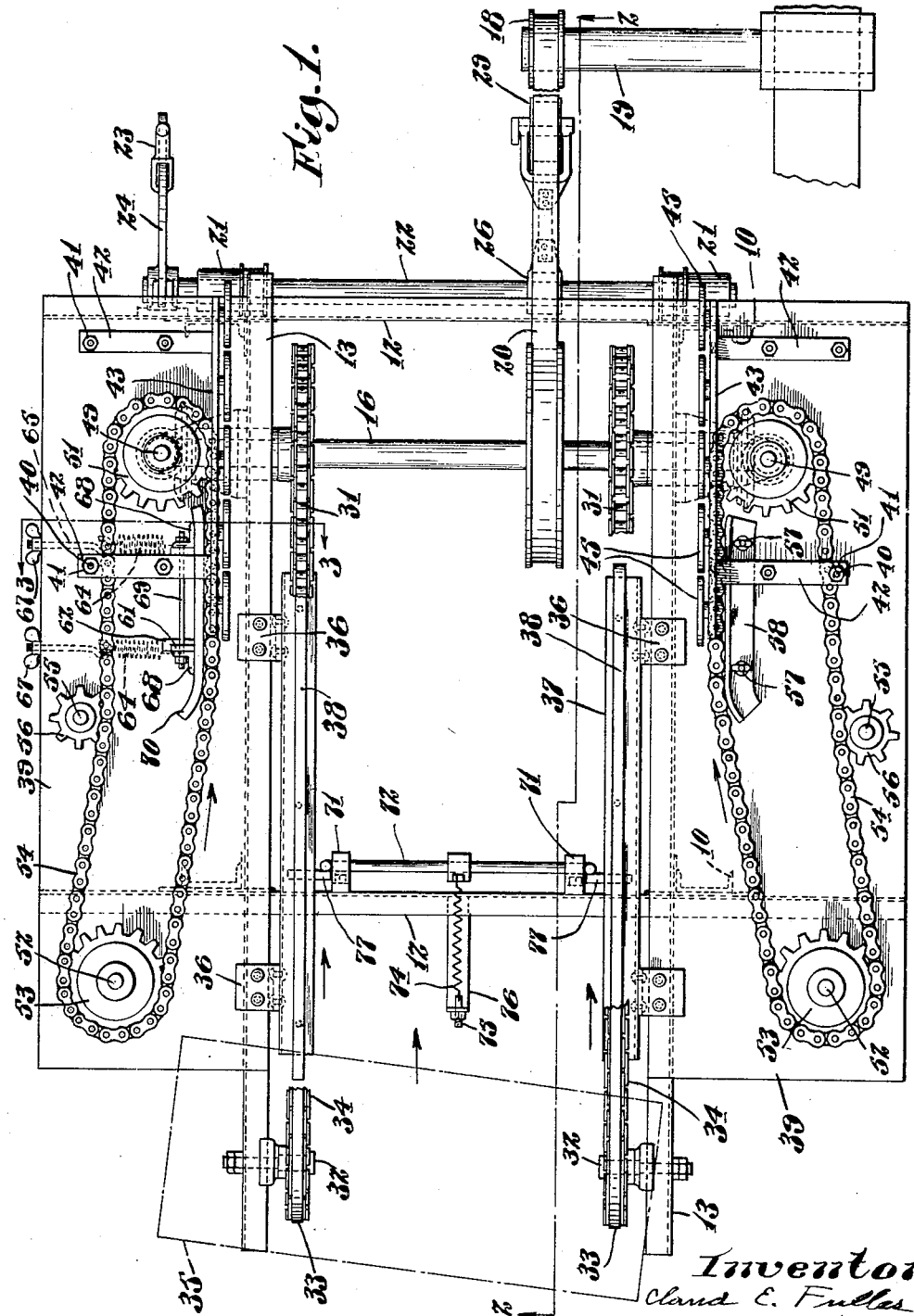
Inventor
Claud E. Fuller
by James P. Hodder
attorney Oct. 29, 1929.  C. E. FULLER  1,733,221
PALLET SQUARING AND ALIGNING DEVICE
Filed Oct. 12, 1927  2 Sheets-Sheet 2
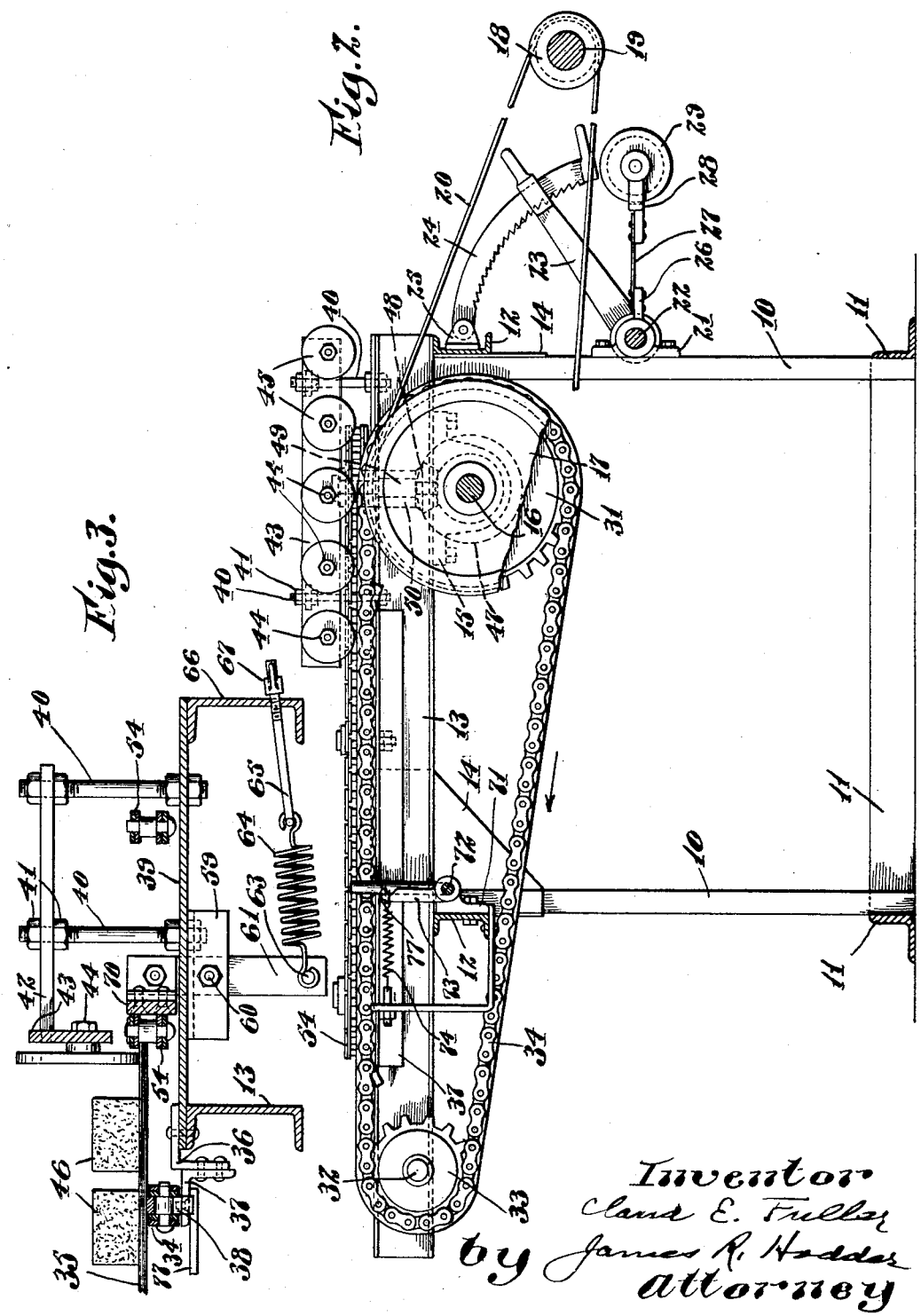
Inventor
Claud E. Fuller
by James R. Hodder
Attorney Patented Oct. 29, 1929

1,733,221

UNITED STATES PATENT OFFICE

CLAUD E. FULLER, OF NEW YORK, N. Y., ASSIGNOR TO THE AMERICAN EQUIPMENT COMPANY, OF CHICAGO, ILLINOIS, A CORPORATION OF OHIO

PALLET SQUARING AND ALIGNING DEVICE

Application filed October 12, 1927. Serial No. 225,803.

My present invention relates to brick making machines and more particularly to an improved pallet squaring and aligning device for brick making machines.

In the manufacture of bricks by the soft mud process, the material of which the bricks are made is ground in a pug mill and extruded into a brick mold, such brick mold having spaces therein for a plurality of brick arranged side by side and the filled mold has associated therewith a pallet which is utilized to hold the brick after the mold is removed therefrom. The pallet with the brick thereon is moved in any suitable manner or by any suitable means into a dryer, where the brick are subjected to a preliminary drying operation, after which the pallets containing the brick are removed from the dryer and forwarded to a hacking machine, and during such forwarding movement and prior to being hacked, the bricks are removed from the pallets, which are sent back to be reused. In forwarding the loaded pallets to the hacking machine, the pallets are operated on by a discharge mechanism which ordinarily positions the pallets so as to have the brick readily removed therefrom. The pallets on which the brick are carried are rectangular plates of iron or similar metal and in order to afford ease in handling, such plates are as thin as possible, and due to their thinness, and the rough handling to which they are subjected, such pallets become warped, bent, and generally out of shape. During their passage from the drying to the discharge mechanism, they are carried by a conveyor that is often of considerable length, and by the time the pallets have reached the discharge device, they are out of alignment, both with respect to each other and to their line of travel. In order that the discharge device may properly function, it is essential that the pallets be fed thereto evenly and squarely, and my present invention is directed to a mechanism associated with the conveyor and lying between the dryer and discharge device which will operate on each pallet as it is brought along by the conveyor and will straighten or square or align such pallets, both with respect to each other and to the line of travel of the conveyor.

My present invention is adapted for use in brick handling machines and is adapted more particularily for use in connection with automatic push-off and up-edging machines such as is disclosed and claimed in the copending application, Serial No. 213,302, filed August 16, 1927, invented by myself and R. C. Penfield jointly.

The object of my invention, therefore, is an improved squaring and aligning device for brick carrying pallets.

In the accompanying drawings illustrating a preferred embodiment of my invention, Fig. 1 is a plan view;

Fig. 2 is a sectional elevation on the line 2—2 of Fig. 1, and

Fig. 3 is a section on the line 3—3 of Fig. 1.

Referring to the drawings, 10 designates vertically arranged channel irons spaced apart from each other and having secured at their bottom portions angles 11, the whole defining a rectangular open framework. Secured to the upper end of the channel irons 10 and arranged parallel to each other in a transverse direction are channel irons 12. Secured to the channel irons 12 and to the uprights 10 and arranged parallel to each other are channels 13. Gussets 14 are utilized to stiffen the corners of the rectangular frame composed of the members 10 and 11.

Secured to the under side of the channels 13, adjacent the right-hand end thereof, as in Fig. 2, are alined bearings 15, in which bearings is rotatably mounted a shaft 16. Secured to the shaft 16 intermediate the bearings 15 is a pulley 17 that is in alignment with a second pulley 18 secured to a drive shaft 19, that is rotatably mounted in any suitable manner and which is conected to any suitable source of power (not shown). Around the pulleys 17 and 18 is a belt 20 by means of which power may be transmitted from the drive shaft 19 to the shaft 16. Secured to the pair of uprights 10 adjacent to the shaft 16 and in alignment with each other are bearings 21, and in such bearings is rotatably mounted a shaft 22. This shaft has secured at one end an operating lever 23 with which co-operates a ratchet segment 24 that is pivotally mounted to a member 25 that, in turn, is secured to one of the cross channel irons 12. Also secured to the shaft 22 is a member 26, which carries at its outer end a spring member 27 that, in turn, has secured thereto a yoke 28, in which is rotatably mounted an idler pulley 29. The construction just described is such that the idler pulley 29 is engagement with the belt 20 and acts as a tension device therefor and the operating lever 23, together with the ratchet segment 24 determines the amount of tension to be placed on the belt 20.

Secured to the shaft 16 adjacent to each of the parallelly arranged and longitudinally extending channel irons 13 is a sprocket wheel 31. At the other end of the channel irons 13 are secured stub shafts 32, such stub shafts being in axial alignment with each other and on each of said stub shafts is radially mounted a sprocket wheel 33. Each sprocket wheel 33 is in alignment with the respective sprocket wheel 31 adjacent the other end of such channel irons 13, and over the pairs of sprocket wheels 31 and 33 runs an endless sprocket chain 34. The upper reach of said sprocket chain 34 lies in the same horizontal plane and slightly above the upper surface of the parallelly and longitudinally arranged channel irons 13, and such endless sprocket chains 34 constitutes endless conveyors for articles to be transported thereover, such as, for example, pallets 35, one of which is indicated in dotted lines in Fig. 1. Secured to the top surface of each of the parallelly and longitudinally arranged channel irons 13 and extending inwardly therefrom and toward each other are angle irons 36, these angle irons 36 being arranged in pairs, one pair on each of the channel irons 13, and secured to each pair and extending parallelly to but spaced apart from the channel irons 13 are angle iron members 37, which have secured to their top face a bar 38. This bar is of a width to be a solid fit between the links of the conveyor chains 34 and acts to prevent the upper reach of such conveyor chains from having any lateral movement within the limits of the length of the members 37. Secured to each of the longitudinally and parallelly arranged channel irons 13 are plates or platforms 39, such platforms extending practically throughout the length of the channel irons 13 and are of any suitable width. At one end of such platforms 39, preferably the end nearest the shaft 16, are secured uprights 40 of any suitable size and number. The uprights 40 are arranged in pairs transversely of the machine, and over each pair of uprights is adjustably mounted, by means of nuts 41, inwardly extending bars 42. To the inner end of each pair of bars 42, there being one pair of bars 42, on each side of the machine, is secured a vertically arranged plate or bar 43. Each plate or bar 43 is provided with a plurality of parallelly and horizontally arranged stub shafts 44 on each one of which is rotatably mounted a roller 45 and a horizontal plane passing through the lower ends or surfaces of each of the rollers 45 would also lie in the top surface of the pallet 35 carrying the brick 46, as clearly shown in Fig. 3.

To each end of the shaft 16 is secured a bevel gear 47 and each such bevel gear meshes with and drives a bevel pinion 48 secured to the lower end of a shaft 49, rotatably mounted in a bearing 50 secured to the under side of each of the platforms 39. Above the platforms 39 and to the upper end of the shafts 49 are secured sprocket wheels 51. Adjacent the other end of each of the platforms 39 are vertically arranged stub shafts 52 on which are rotatably mounted sprocket wheels 53, such sprocket wheels 53 being in alignment with the sprocket wheels 51 above described, and over the pairs of sprocket wheels 51, 53 run sprocket chains 54, these sprocket chains 54, therefore, lying in a horizontal plane. Also secured to the platforms 39 are stub shafts 52 and on such stub shafts are rotatably mounted idler sprocket wheels 53 which engage with the sprocket chains 54. On one of the platforms 39 adjacent that portion of the inner reach of the conveyor chain 54 that is closest to the sprocket 51 is secured, by thumb screws 57, an angle plate 58, this angle plate acting as a guide for the inner reach of the endless conveyor chain 54 to guide it in a path parallel to the endless conveyor chains 54 and also parallel to the rollers 45. Such plate 58 is adapted to be engaged by one end of each of the pallets 35 and limits the endwise movement of such pallets in an outward direction. On the platform 39 opposite the angle 58 are secured on the under side thereof bracket members 59 spaced apart from each other and in such bracket members is secured a shaft 60. On the shaft 60 are rotatably mounted vertically arranged plates or bars 61 which extend upwardly through perforations 62 in a platform 39. The lower end of the vertically arranged bars 61 are tied together by a shaft 63, and secured to the bars 63 intermediate its ends is one end of a coil spring 64, the other end of which is secured to a bar 65 which has one end threaded and passed through a perforation in a channel iron 66 secured to the under side of the platform 39 and lying parallel to the adjacent channel iron 13. The tension of the coil spring 64 may be adjusted by means of the thumb nut 67 on the threaded end of the rod 65. The vertically arranged bars 61 extend upwardly beyond the platform 39 and have secured at their upper end angle members 68. The angle members 68 and the upper ends of the bars 61 are tied together by a rod or shaft 69, while to the inner face of the angle member 68 is secured a guide plate 70 which lies parallel to the inner edge of the angle member 58 above referred to as being on the opposite platform 39 and the member 70 engages with the inner reach of the endless conveyor 54 and constrains such reach to move parallel to the conveyor chains 34 and parallel to the rollers 45. The guide member 70 being yieldingly held inward, is adapted to engage with the end of the pallets 35 and urge such pallets transversely of the direction of motion of the endless conveyors 34 or over into engagement with the guide 58 on the opposite platform 39.

The endless conveyors 34 and 54 move in the direction of the arrows shown and the connections between the same and the driving mechanism is such that the surface speed of all of such conveyor chains is the same. Consequently, if a pallet 35, riding on the conveyor chain 34, moves from left to right, as viewed in Fig. 1, and is engaged by one only of the endless conveyors 54, there will be no tendency on the part of such conveyor to move the end in engagement therewith faster than the other end of such pallet is traveling. Therefore, any movement of the pallet 35, other than an onward feeding one, will be an endwise movement toward the opposite endless conveyor 54. In order to insure that the pallets 35 will be squared or aligned with respect to the movement of the endless conveyors 34, I have secured to the inner face of the transverse channel iron 12, remote from the shaft 16, bearing brackets 71, such brackets being in alignment with and spaced apart from each other, and in such bearing brackets is rotatably mounted a U-shaped member 72 with the arms of such U-shaped member extending upwardly and terminating just above the upper surface of the upper reach of the endless conveyor chains 34. Such upper ends are, therefore, in position to be engaged by the pallets 35 in their onward movement through the device. Also secured to the U-shaped member 72 is an upwardly extending arm 73, to which is attached one end of a coil spring 74. Such coil spring is secured to an adjusting device 75 that passes through a perforation in a member 76 secured to the under surface of the channel iron 12. The spring 74, therefore, tends always to rotate the upwardly extending arms of the U-shaped member 72 in a counter-clockwise direction, such counter-clockwise direction being limited by stop bars 77 secured to and extending inwardly from the spaced angle plates 37.

In operation, and assuming the device to have been constructed as above described, and with the endless conveyor chains 34 and 54 moving in the same direction and at the same rate of speed, and that a pallet 35 is fed thereto in an angular position with respect to the direction of movement of such parts, or as indicated in Fig. 1, then it is evident that such pallet 35 will be moved to the right, as shown in Fig. 1, and will, under ordinary circumstances, come into engagement with the upper conveyor 54, as viewed in Fig. 1, before it can possibly engage with the lower conveyor 54. Also the upper front edge—as viewed in Fig. 1—of such pallets 35 will engage with the upper arm of the U-shaped member 72 before the lower front edge thereof can possibly engage with the lower arm of the U-shaped member 72. The tension of the springs 74 is so arranged that the front edge of the pallet 35 must engage with both upper and lower—as viewed in Fig. 1—arms of the U-shaped member 72 before the tension of the spring 74 will have been overcome and the U-shaped member 72 rotated in a clockwise direction in its bearing 71. Therefore, when the upper edge of the pallet 35 engages with the upper arm of the U-shaped member 72, the upper end of the pallet 35 will be brought to rest and the lower end thereof will be swung about the upper arm of the U-shaped member 72 as a pivot until the lower front edge thereof engages with the lower arm of the U-shaped member 72. When this happens, the front edge of the pallet 35 will be at right angles to the direction of movement of the various conveyors and, therefore, the pallet 35 will be squared with its direction of travel. When the front edge of the pallet 35 engages both arms of the U-shaped arms 72, the tension of the spring 74 is overcome and the friction of the endless conveyors 34 on the pallet 35 will cause the pallet 35 to ride over and beyond the upper and lower arms of the U-shaped member 72, which will then spring back into its original position, due to the spring 74. The now squared pallet 35 will move onward and under the above assumption, its upper edge will engage with the upper endless conveyor 54 and such endless conveyor will cause a sliding movement of the pallet 35 transversely of the endless conveyors 34 or until such time as the pallet 35 is brought into engagement with both endless conveyors 54 simultaneously. The pallet 35 is, therefore, aligned with respect to its line of movement and will move forward under the rollers 45 and outward of the device shown in the drawings to have subsequent operations performed on the brick 46 resting thereon.

While I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. In a device of the kind described, the combination of a pair of endless conveyors spaced apart from each other and having the upper reach thereof lying in the same plane, means for driving said conveyors in the same direction, and at the same rate of surface speed, pivotally mounted means extending outward with respect to said conveyors and adapted to engage articles transported by the conveyors, means for yieldingly holding said device in position with respect to the conveyors until the articles transported on the conveyors lie at right angles to the path of travel of said conveyor.

2. In a device of the kind described, the combination of a pair of conveyors spaced apart from and lying parallel to each other, means for preventing transverse movement of the upper reach of said conveyors, means for driving the conveyors in the same direction and at the same rate of surface speed, and a yieldingly mounted squaring device for squaring articles transported on the conveyor with respect to the direction of travel of the conveyors.

3. In a device of the kind described, the combination of a pair of conveyors arranged parallel to and spaced apart from each other and having their upper reaches lying in the same horizontal plane, a conveyor associated with each of the first said conveyors, and having both the reaches thereof lying in the same horizontal plane and above the horizontal plane in which lie the upper reaches of the first said conveyors, means for driving said second set of conveyors in the same direction and at the same surface speed as the first said conveyors, and means associated with the first said conveyors for squaring articles to be transported thereon.

4. In a device of the kind described, the combination of a pair of conveyors arranged parallel to and spaced apart from each other and having their upper reaches lying in the same horizontal plane, a conveyor associated with each of the first said conveyors, and having both the reaches thereof lying in the same horizontal plane and above the horizontal plane in which lie the upper reaches of the first said conveyors, means for driving said second set of conveyors in the same direction and at the same surface speed as the first said conveyors, means associated with the first said conveyors for squaring articles to be transported thereon, and yielding means associated with one of the horizontally arranged conveyors for forcing the articles transported on the first said conveyors transversely of the direction of movement thereof.

In testimony whereof, I have signed my name to this specification.

CLAUD E. FULLER.